US006975782B2

(12) United States Patent
Maki et al.

(10) Patent No.: US 6,975,782 B2
(45) Date of Patent: Dec. 13, 2005

(54) OPTICAL DEFLECTOR USING ELECTROOPTIC EFFECT TO CREATE SMALL PRISMS

(75) Inventors: Jeffery Maki, Fremont, CA (US); Paul Breaux, Volente, TX (US)

(73) Assignee: Finisar Corporation, Sunnyvale, CA (US)

( * ) Notice: Subject to any disclaimer, the term of this patent is extended or adjusted under 35 U.S.C. 154(b) by 206 days.

(21) Appl. No.: 10/278,209

(22) Filed: Oct. 21, 2002

(65) Prior Publication Data

US 2004/0076357 A1 Apr. 22, 2004

(51) Int. Cl.[7] .............................................. G02F 0/295

(52) U.S. Cl. ............................. 385/8; 385/9; 359/315; 359/322

(58) Field of Search ............................... 385/2, 3, 4, 8, 385/9, 10; 359/232, 345, 315, 322, 483, 484

(56) References Cited

U.S. PATENT DOCUMENTS 4,902,088 A * 2/1990 Jain et al. ...................... 385/8
5,009,483 A * 4/1991 Rockwell, III .............. 385/116
5,317,446 A * 5/1994 Mir et al. ................... 359/296
5,802,223 A * 9/1998 Nashimoto ..................... 385/8
6,025,864 A * 2/2000 Nashimoto .................. 347/243
6,141,465 A * 10/2000 Bischel et al. ................. 385/4
6,385,355 B1 * 5/2002 Nashimoto et al. ............ 385/8
6,400,855 B1 * 6/2002 Li et al. ........................ 385/4

OTHER PUBLICATIONS

"Data Sheet—S4200XX Series—Fiber Array Assemblies," ACT MircorDevices, Inc., Feb. 25, 2000.
Untitled document at www.highwave-tech.com, Nov. 16, 2000.

* cited by examiner

*Primary Examiner*—John R. Lee
*Assistant Examiner*—David A. Vanore
(74) *Attorney, Agent, or Firm*—Workman Nydegger

(57) ABSTRACT

An electrooptical deflector is presented. The electrooptical deflector includes a material that has a different refractive index for different polarization states and changes its refractive index in response to voltage (e.g., lithium niobate or lithium tantalite). Inside the material is a poled region that includes triangularly-shaped prisms, each of which affects the direction in which an incident light beam propagates. When a light beam of a known polarization state propagates through the material, its direction of propagation (i.e., the amount of deflection) is controlled by a voltage applied to the poled region and the size and number of the prisms in the material.

38 Claims, 10 Drawing Sheets

OPTICAL DEFLECTOR USING ELECTROOPTIC EFFECT TO CREATE SMALL PRISMS

BACKGROUND OF THE INVENTION

This invention relates to optical deflectors and to systems incorporating such optical deflectors.

The demand for information has grown tremendously in the past few decades, leading to an increased demand for communication capability. Naturally, this increased demand for communication capability is accompanied by an increase in demand for information storage capability. The increased demand for communication capability is at least partly met by optical communication systems that use a network of fiber optic cables. As for the increased demand for optical storage capability, much research is being done to provide an optical storage media that allows storage of more data and easy access of the stored data.

Optical storage media that use light to store and read data have been the backbone of data storage for about two decades. Among various optical storage media, CDs and DVDs are the primary data storage media for music, software, personal computing and video. CDs, DVDs and magnetic storage all store bits of information on the surface of a recording medium. A typical CD can hold 783 megabytes of data, which is equivalent to about one hour and 15 minutes of music. Some special high-capacity CD can hold up to 1.3-gigabyte (GB) of data, and a double-sided, double-layer DVD can hold 15.9 GB of data, which is about eight hours of movies. These storage mediums meet today's storage needs, but storage technologies have to evolve to keep pace with increasing consumer demand.

In order to increase storage capability, scientists are now working on a new optical storage method frequently called holographic memory. Unlike CDs and DVDs that store data only on the disc surface, holographic memory stores data three-dimensionally, in the volume of the recording medium in addition to the surface area of the disc. Three-dimensional data storage stores more information in a given volume and offers faster data transfer times.

However, holographic memory technology has its problems. For example, angular multiplexed holographic memory systems are facing obstacles in the area of dynamic control of two dimensional page oriented data. The root of these obstacles is that currently existing page-addressing deflectors require a moving mechanical optical assembly that cause poor stability and throughput rate. In order to mass-store high density images and access them fast without any moving parts, an innovative page-addressing deflector free of moving parts is required. High-speed electro-optic beam deflectors can significantly improve the performance of the volume holographic memory based on angular multiplexing techniques.

A reliable holographic memory system with large capacity and high throughput rates would find commercial applications in telecommunication, large database storage and processing and other applications. Furthermore, the electro-optic (EO) beam deflectors used in the holographic memory would be used in laser printers, optical computing, laser communication systems, optical sensors, and optical switching networks. A reliable EO deflector with large deflecting angle at low driving voltage, fast slew rate, light weight, simplified fabrication scheme, and compact structure would be advantageous whenever there is a need for low power fast optical beam steering.

SUMMARY OF THE INVENTION

An electrooptical deflector is presented. The electrooptical deflector includes a lithium niobate slab having an entrance surface through which a light beam enters the lithium niobate slab and an exit surface through which the light beam exits the lithium niobate slab. A poled region is formed on the lithium niobate slab between the entrance surface and the exit surface. Furthermore, an electrode is coupled to the lithium niobate slab for applying an electrical bias to the poled region. The light beam's direction of deflection as it propagates through the poled region is controlled by the electrical bias.

DETAILED DESCRIPTION OF THE INVENTION

The invention is particularly directed to an electrooptic switch, such as an electrooptic switch made with lithium niobate (LNO) or lithium tantalate. It will be appreciated, however, that this is illustrative of only one utility of the invention, which is not limited to the embodiments and uses described herein.

Figure 1:
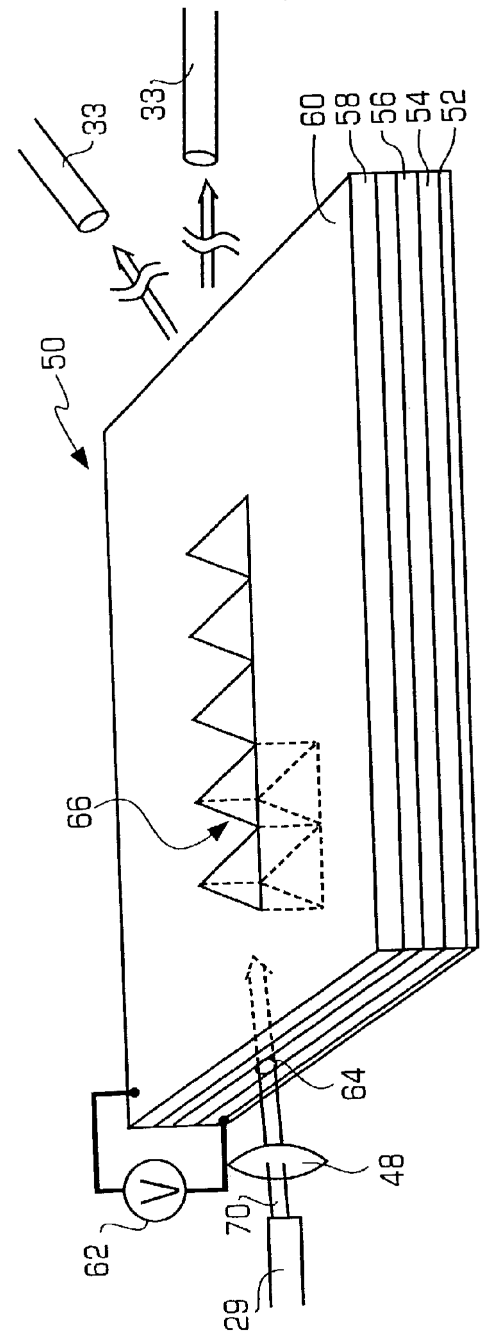
FIG. 1 depicts an electrooptical deflector in accordance with the invention.

FIG. 1 depicts a first optical fiber 29 and a deflector 50 that may be used to implement various optical devices, e.g., switches. An input lens 48 is located between the optical fiber 29 and the deflector 50. The deflector 50 includes a lower electrode 52, a lower buffer layer 54, a core layer 56, an upper buffer layer 58, and an upper electrode 60. The lower electrode 52 and the upper electrode 60, which are typically made of an electrically conductive material, may cover the entire bottom and top surfaces of deflector 50 but is not limited to being any size or shape. The lower electrode 52 and the upper electrode 60 are coupled to a voltage source 62. The buffer layers 54 and 58 may each be a transparent dielectric layer having a refractive index less than that of the core layer 56. The buffer layers 54 and 58 typically includes silicon dioxide doped with $In_2O_3$ and/or $TiO_2$. The core layer 56 is herein also referred to as a "LNO slab 56". The LNO slab 56 includes an input waveguide 64, a prism array 66, and a plurality of output waveguides (not shown). The input waveguide 64 may be a planar/slab waveguide. The prism array 66 includes a poled region in the LNO core layer that deflects an incident light beam when an electrical bias is applied through electrodes 52 and 60.

A light beam 70 propagates in optical fiber 29 and reaches input lens 48. The light beam is preferably linearly polarized. The input lens 48 focuses the light beam into the input waveguide 64 so that the input light beam 70 propagates into the LNO slab 56 and reaches the prism array 66. The light beam may be deflected by the prism array 66 if the beam has the proper polarization state and the electrical bias applied through the electrodes 52 and 60 causes deflection. The light beam may travel through LNO slab 56 without being deflected. Although not shown, the deflected light beam may be focused into an output optical fiber 33 by an output lens after exiting the prism array 66.

The LNO slab 56 may be designed to be as thick as possible without allowing the beam to diverge excessively. The LNO slab 56 may be, for example, approximately 100–300 $\mu$m thick. Reducing the thickness of the LNO slab 56 results in reduction of the amount of voltage that is needed to control the deflection angle of the beam. Therefore, using a thin LNO core creates a more energy-efficient deflector. The LNO slab may be 3–10 mm long.

The prism array 66 is not limited to any number of prisms, but may include any number of prisms necessary to achieve the desired deflector linearity with applied voltage. The prisms in prism array 66 are preferably triangular-shaped. In some embodiments, all the prisms in prism array 16 may be identical. In other embodiments, the prisms may vary in size, for example by getting progressively larger in the direction of beam propagation. The prisms of the prism array 66 do not have to be lined up as shown in the Figures. A prism may be, for example, 0.1–1.2 mm in height. One way of determining the prism height is to maximize the number of resolvable spots (N) based on the following formula:

$$N=n_o r_{33} V L \pi \omega_o / 2dh\lambda,$$

wherein $n_o$=index of refraction along the ordinary axis in the LNO layer, which is typically around 2.214;

$r_{33}$=electro-optic coefficient in picometers/volt, which is typically around 31 pm/V for a beam having $n=n_o$;

V=applied voltage;

L=length of LNO slab;

$\omega_0$=minimum beam waist;

d=thickness of LNO slab;

h=prism height; and $\lambda$=beam wavelength, which may be 1.55 $\mu$m.

Figure 2:
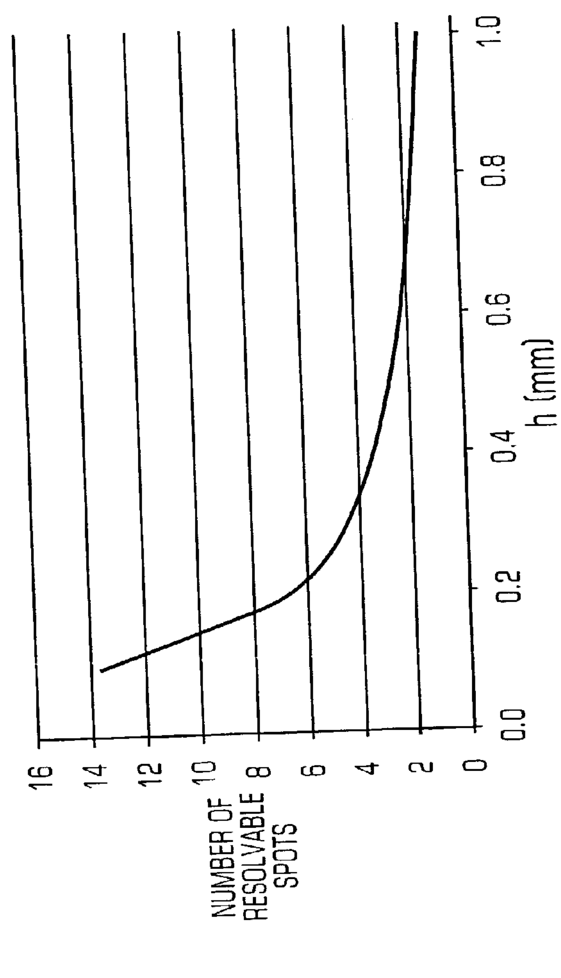
FIG. 2 depicts a plot of the number of resolvable spots (N) as a function of prism height (h)

FIG. 2 depicts a plot of the number of resolvable spots (N) as a function of prism height (h). As prism height (h) increases, the number of resolvable spots decreases. Thus, it is desirable to have short prisms in prism array 66, although h must always be greater than approximately $2\omega_0$ to avoid beam clipping. For the deflector to be incorporated into a compact, relatively low-cost device, the size of the deflector and the intensity of the input beam should be adjusted so that the operating voltage is around 200–400 Volts for two resolvable spots. If the input beam has a high intensity, for example, the voltage necessary to deflect the beam would increase and the switching time would slow down.

The prism array 66 may be formed by applying an electric field poling method to the LNO core layer. Electric field poling aligns the dipole moments of the atoms in the LNO slab 56. Preferably, domain inversion is achieved by poling a triangular prism region in one direction and poling the region outside the triangular prism region in an opposite direction. Domain inversion is a well-known standard technique for increasing the effectiveness of poling.

It is essential to know the right poling parameters such as poling temperature and maximum achievable electric field in order to avoid a breakdown of prism array 66. In a sandwich structure such as the one shown in FIG. 1, the electric and dielectric properties of the different layers as well as the choice of the conductive material used for the electrodes will determine the electrical poling field strength inside the active layer and the magnitude of the current flowing through the sandwich structure. A person of ordinary skill in the art would understand that it is important to (1) maximize the effective poling field inside the LNO-layer in order to obtain a high degree of noncentrosymmetrical order and, hence, a high EO-coefficient and (2) minimize the current flow through the sandwich in order to avoid dielectric (avalanche) breakdown at higher fields.

Once light beam 170 enters deflector 50 through the input waveguide 64, the polarization state of the light beam 170 and the applied electrical bias are used to manipulate the deflection angle of the input light beam 170 (e.g., a laser beam). The angle of deflection may be controlled by the amount of voltage applied to electrodes 52 and 60. For example, in one embodiment, applying a high voltage may result in a large overall angle of deflection while applying a weak voltage may result in a small overall angle of deflection. Applying a positive voltage may result in deflection in one direction and applying a negative voltage may result in deflection in another direction. The amount of deflection can be adjusted continuously by adjusting the voltage continuously. For a given applied voltage, the angle of deflection can be varied discretely between either of two angles by changing the polarization states of the light beam. Preferably, the input beam has a known polarization state. The prism array 66 deflects the input beam into different directions depending on the polarization state of the beam, as illustrated below in FIG. 9. By being deflected by a specific angle through selection of the voltage and/or polarization state, the light beam is directed into a desired one of the plurality of output optical fibers 33. The output optical fibers 33, which may be single mode optical fibers, may be placed near deflector 50 or incorporated into deflector 50 in a manner similar to the input waveguide 29. The output optical fibers 33 may be pigtailed to the deflector.

Figure 3A:
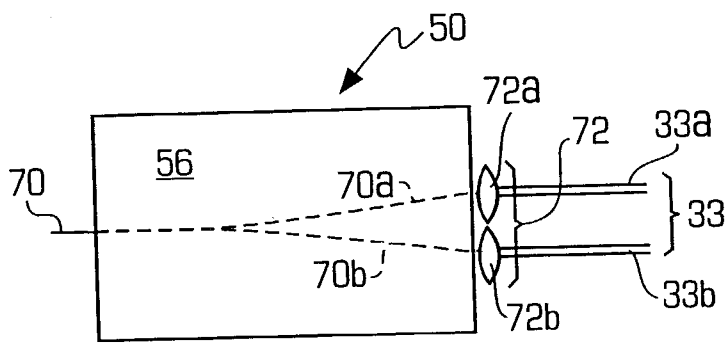
FIG. 3A, FIG. 3B, FIG. 3C, and FIG. 3D depict top views of different configurations for the electrooptical deflector.

FIG. 3A, FIG. 3B, FIG. 3C, and FIG. 3D depict top views of different embodiments of output waveguides. These embodiments allow the deflector to be implemented in a compact device, for example by using microlens arrays. Although FIGS. 3A–3D depict a 1×2 switch for simplicity, the deflector 50 is not limited to being a 1×2 switch. In FIG. 3A, a beam 70 that enters LNO slab 56 may be deflected upward as deflected beam 70*a*, or downward as deflected beam 70*b*. If the beam is deflected upward, deflected beam 70*a* passes through an upper output lens 72*a* that is located to receive and focus deflected beam 70*a* into a first waveguide 33*a*. If, on the other hand, the beam is deflected downward, deflected beam 70*b* passes through a lower output lens 72*b* that is located to focus beam 70*b* into a second waveguide 33*b*. The output lenses 72*a* and 72*b* may be parts of a linear micro-lens array. V-grooves may be present between prism array 66 (FIG. 1) and the output lenses 72*a* and 72*b*, and also between output lenses 72*a* and 72*b* and optical fibers 33. Each of the output lenses 72 may also include a numerical aperture adapting lens that helps achieve the desired output spot size.

Figure 3B:
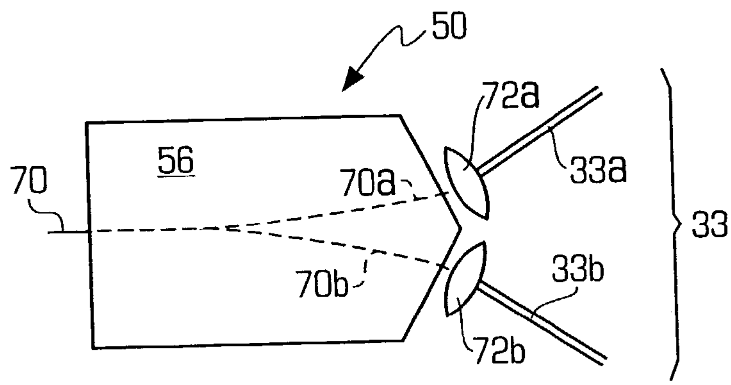

FIG. 3B depicts an alternative embodiment of output lens 72 and optical fibers 33. This embodiment differs from the embodiment in FIG. 3A mainly in that the surface of the LNO slab 56 through which the deflected light beam exits is angled instead of being flat. Preferably, the exit surface of the LNO slab 56 is angled so that a deflected beam 70*a* or 70*b* would be incident on the surface at a substantially normal angle. The output lenses 72*a* and 72*b* are positioned so that they are square with the angled surface of the LNO slab, and each output lens is coupled to one of optical fibers 33. Thus, a deflected beam 70*a* passes through output lens 72*a* and is focused into optical fiber 33*a*. The deflected beam 70*b*, on the other hand, is focused into optical fiber 33*b* by output lens 72*b*. The angled surfaces of the LNO slab causes the output lenses 72*a* and 72*b* to be tilted with respect to the direction in which the input beam 70 propagated when it entered LNO slab 56. This angled-surface embodiment directs the deflected beam 70*a* or 70*b* into a waveguide 33*a* or 33*b* more efficiently than the embodiment in FIG. 3A where the lenses 72*a* and 72*b* are aligned with the input beam 70 instead of the deflected beams 70*a* and 70*b*. A dicing saw may be used to form precisely angled surfaces on the exit surface of LNO slab 56.

Figure 3C:
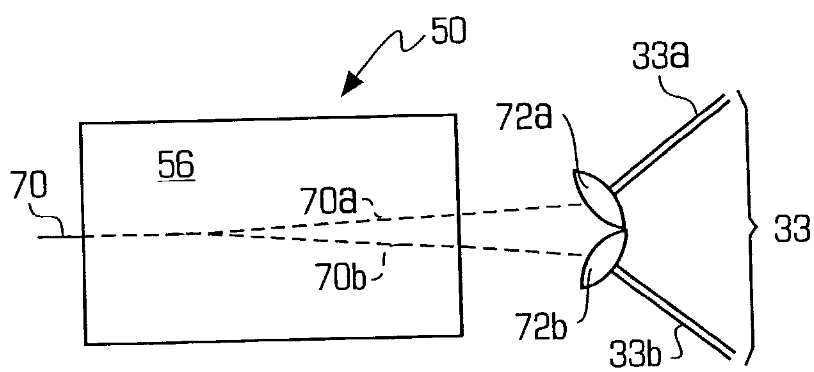

FIG. 3C depicts yet another embodiment of deflector 50. This embodiment includes an LNO slab that has a flat exit surface, similar to the LNO slab of FIG. 3A. However, unlike the embodiment of FIG. 4A, output lenses 72*a* and 72*b* are "tilted," or positioned at an angle with each other and with the exit surface of the LNO slab. The output lenses 72 are positioned so that they can receive and focus light beams 70*a* and 70*b* with minimum loss. The waveguides 33 may be implemented as angled V-grooves, which are well-known in the art.

Figure 3D:
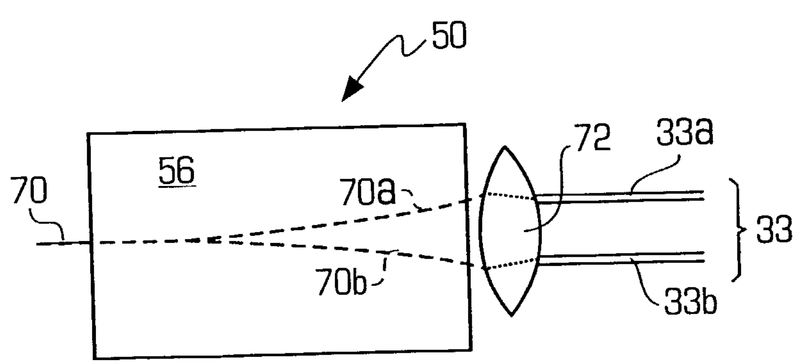

FIG. 3D depicts a fourth embodiment of deflector 54 and output lens 72. In this large-lens embodiment, one large lens is used instead of a micro-lens array as in some of the embodiments above. A person of ordinary skill in the art would know how to select the right type of lens to direct light beam 70*a* and light beam 70*b* into a respective fiber optic 33.

In the embodiments depicted in FIGS. 3A–3D, the output lens 72 may be a traditional collimating lens or a Gradient Index lens, and may be part of a linear micro-lens array. The output optical fiber 33 may be a thermally expanded core (TEC) fiber to reduce coupling loss. The space between the LNO slab 56 and the lens 72 may be filled with epoxy for index-matching. When applying the epoxy, the effect of epoxy on the numerical aperture of the receiving optics must be considered because the presence of epoxy might reduce the numerical aperture of the receiving optics. Epoxy may also be used to fill the space between the input lens 48 (see FIG. 1) and the LNO slab 56.

Although FIGS. 3A–3D show only deflected beams, the input beam 70 does not have to be deflected. Deflection occurs only if the input beam 70 has the right polarization state and the applied voltage is large enough to cause deflection. The input beam 70 may propagate through LNO slab 56 undeflected, and there may be an optical fiber positioned to receive the undeflected beam.

The angled embodiment and the tilted embodiment above help reduce optical loss that occurs when the light beam is directed into an output optical fiber 33. In addition to tilting the lenses and the optical fibers that receive the deflected beams, the optical fibers may be positioned off-center relative to the lenses in order to further reduce optical loss. More specifically, Zygo Teraoptix's irregularly spaced lens array with TEC fibers in V-grooves spaced apart by 125–150 $\mu$m may be used. Plots of the sort shown in FIG. 4 and FIG. 5 may be used to select a position for the output optical fibers 33 while minimizing loss.

Figure 4:
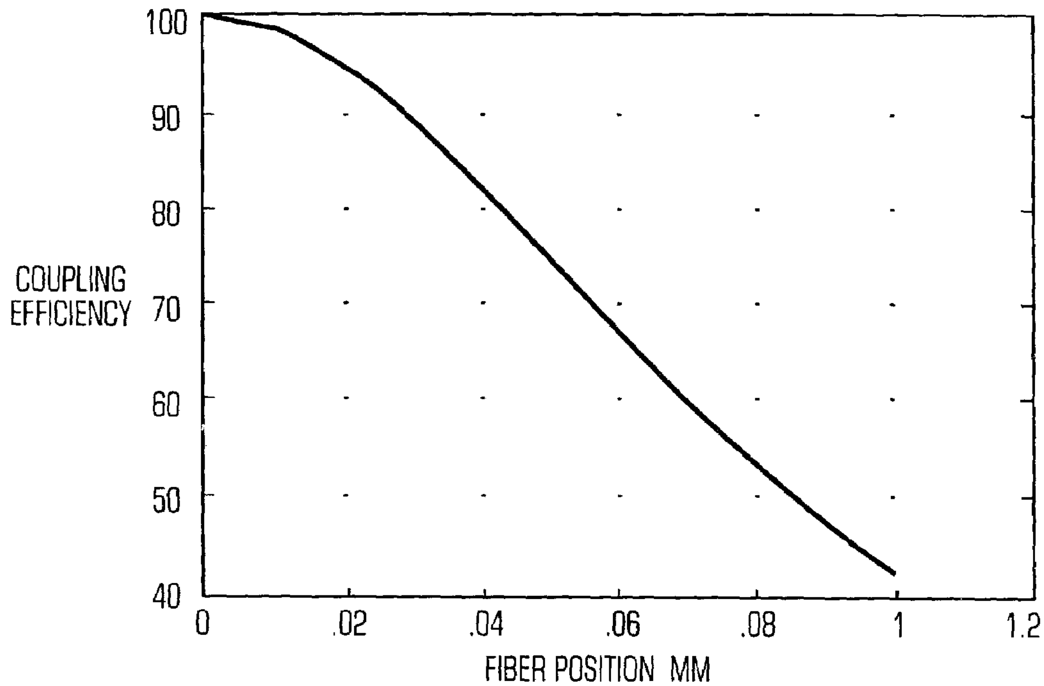
FIG. 4 depicts a plot of coupling efficiency as a function of fiber transverse position.

FIG. 4 depicts a plot of coupling efficiency as a function of fiber position. This plot was generated using a Corning SMF 28 optical fiber. The horizontal axis indicates the distance between the center of the optical fiber and the center of the light beam. When the fiber is aligned perfectly with the beam, coupling efficiency of 100% may be achieved. So, for example, if the deflected beam 70*a* (see, e.g., FIG. 3A) is centered on an optical fiber 33*a*, there is minimum loss of light.

Figure 5:
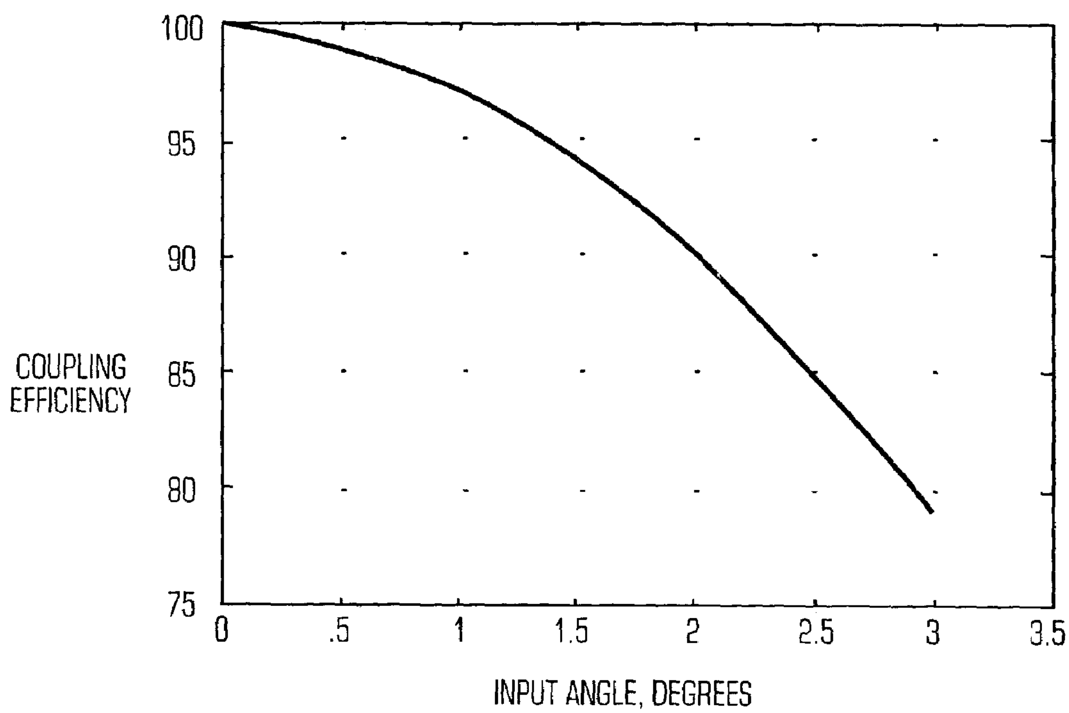
FIG. 5 depicts a plot of coupling efficiency as a function of fiber angular position.

FIG. 5 depicts a plot of coupling efficiency as a function of fiber position. Like the plot in FIG. 4, this plot was generated using a Corning SMF 28 optical fiber. The horizontal axis indicates the angle between the direction in which the deflected light beam propagates and the center of the optical fiber. When the light beam is perfectly aligned with the center of the optical fiber, a coupling efficiency of 100% may be achieved.

Although the highest coupling efficiency is achieved when the light beam and the optical fiber are perfectly aligned, it is not always possible to position the fibers so that they are perfectly aligned with the light beam. For example, if the output lenses 72 have a certain diameter D and must be spaced apart from each other by a distance d, the design and arrangement of output lenses may not be compatible with the optical fibers 33 being placed in perfect alignment with the propagating light beam. Parameters relating to the arrangement of the output lenses 72 and the plots in FIG. 4 and FIG. 5 may be considered in determining the positions of output optical fibers 33.

A person of ordinary skill in the art would understand how to select the type and size of optical components such as output lens 72 in order to maximize the amount of light that is directed into a second waveguide 23 while minimizing loss. Parameters such as beam divergence ($\theta_b$) and confocal beam parameter ($Z_0$) may be used to determine the exact type and configuration of the optical components. These parameters are a function of the width ($\omega_0$) and the wavelength ($\lambda$) of the light beam, as indicated by the following formulas:

$$\theta_b=\lambda/n\pi\omega_0$$

and $$Z_0=(2.2\ \pi\omega_0^2)/\lambda.$$

The beam divergence and the confocal beam parameter together indicate how fast the beam expands or diverges after it is focused. The beam waist should be smaller than the thickness of the LNO slab in order to minimize loss. The numerical aperture of the deflected light beam should be considered, as the output light beam is preferably smaller than the diameter of the output optical fiber 33 for loss minimization.

Figure 6:
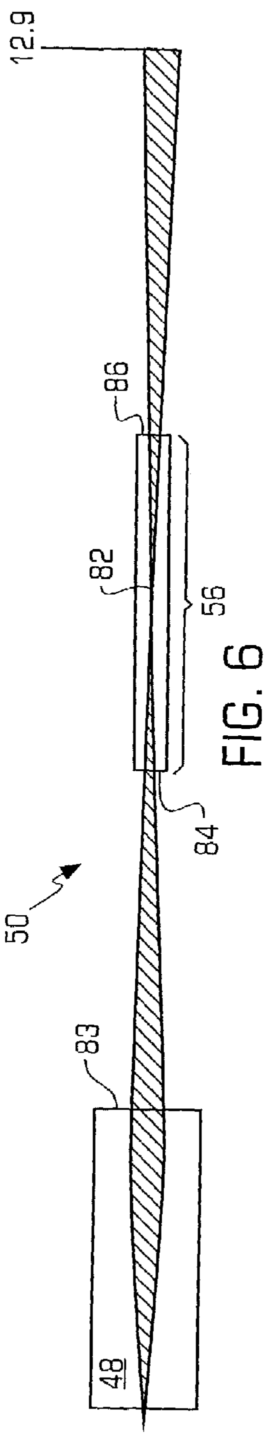
FIG. 6 depicts an embodiment of deflector 50 including an input gradient index lens.

FIG. 6 depicts an embodiment of deflector 50 wherein lens 48 is a Gradient Index lens (GRIN lens) that focuses an incident light beam 70 into LNO slab 56. In an exemplary embodiment, the length of GRIN lens 48 in the direction of beam propagation is 2.845 mm, and the length of the LNO slab 56 is 3.2 mm. The distance between the exit surface 83 of the GRIN lens 48, which is the surface that is closest to the LNO slab 56, and the focal point 82 is about 4.86 mm in this embodiment. The focal point 82 is designed to be approximately near the middle of the LNO slab 56. After the focal point, the light beam begins to diverge and becomes larger. Since the beam diameter is preferably smaller than the thickness of LNO slab 56 throughout the length of the LNO slab, the beam diameter near a surface 84 and the exit surface 86 are about 100 μm. The radius of the light beam near the focal point, or the radius of the light beam where the light beam is the thinnest, is referred to as the "beam waist."

Figure 7:
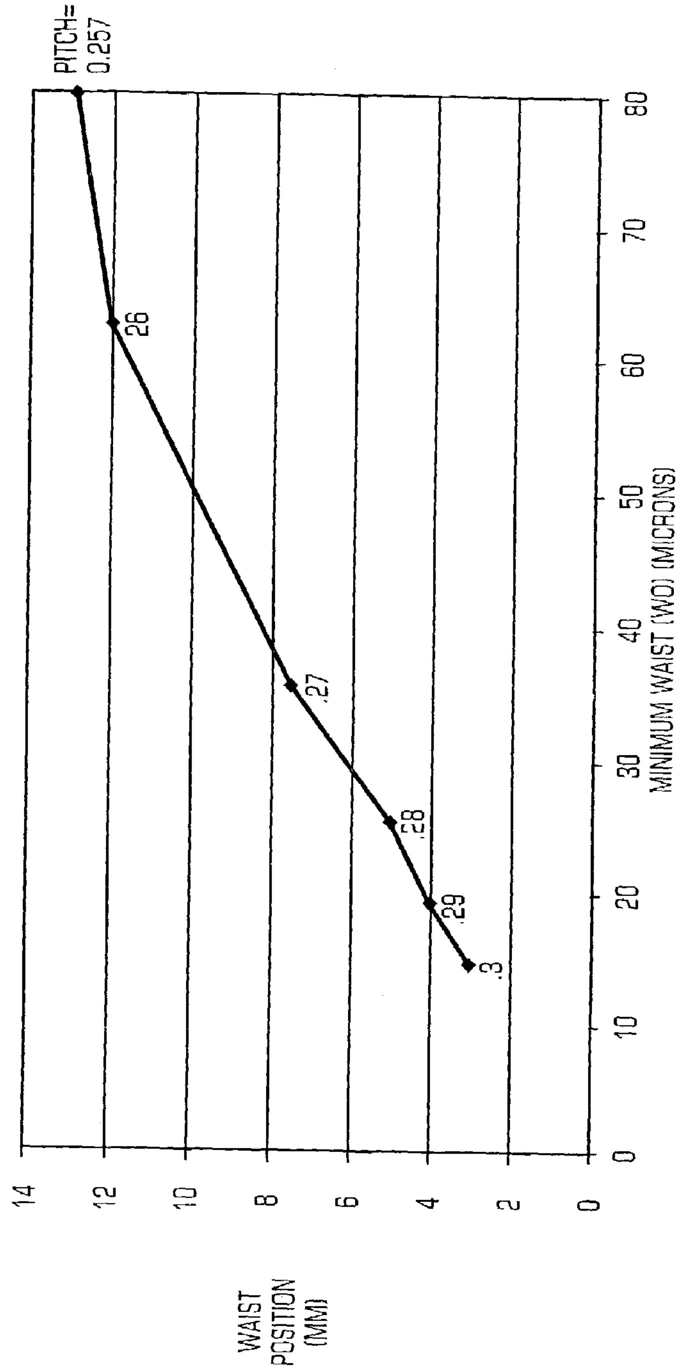
FIG. 7 depicts a plot of the position of the beam waist as a function of the minimum beam waist.

FIG. 7 depicts a plot of the position of the beam waist as a function of the minimum beam waist. The position of the beam waist along the vertical axis is the distance from the surface 83 (FIG. 6) of the input GRIN lens in the direction of beam propagation. A smaller beam waist can be achieved if the focal point 82 is moved closer to the GRIN lens, as indicated by an upward slope of the plot. The pitch of input GRIN lens 48, which is denoted on the plot and next to the data points, is decreased as the minimum beam waist increases. The "pitch", as used herein, refers to the spatial frequency of the light beam trajectory. A light ray that traversed one pitch has traversed one cycle of the sinusoidal wave that characterizes that lens, as indicated by the equation $P=(A)^{1/2}Z/2\Xi$, wherein P=pitch, $(A)^{1/2}$=the gradient constant, and Z=lens length. The GRIN lens 48 may have a pitch of about 0.2 to 0.35.

Figure 8:
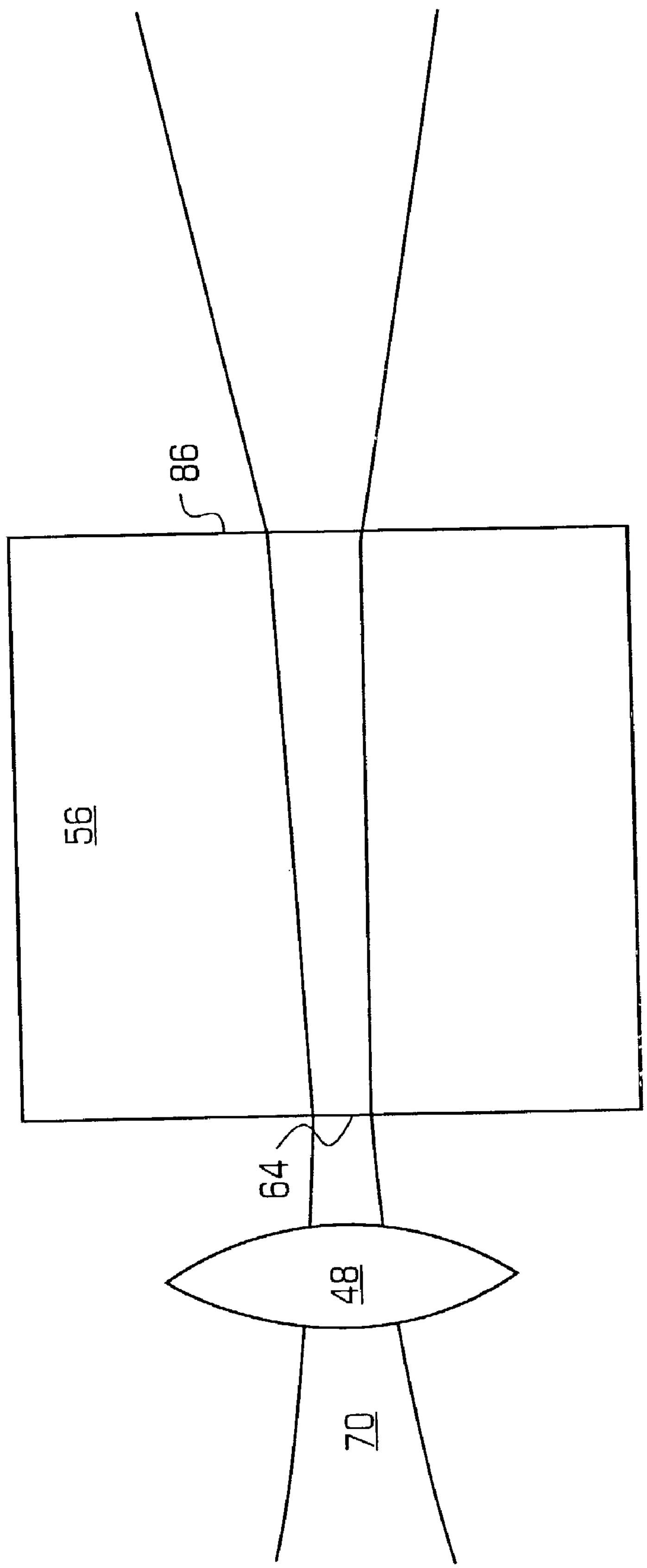
FIG. 8 depicts a side view of an undeflected light beam that enters and exits an LNO slab.

FIG. 8 depicts a side view of an undeflected light beam that enters and exits an LNO slab 54. The apparatus used to produce the light beam includes an input lens 48 (see FIG. 1) near the input waveguide 64 that focuses the light beam into the LNO slab 56. The light beam expands as it propagates through the LNO slab 56. Once the beam propagates across the LNO-air interface 82, the beam diverges at a faster rate because the light beam diverges faster in air than in the LNO slab. Unlike in FIG. 5, where the input beam 70 is focused near the middle of the LNO slab 56, the input beam 70 is focused near the entrance surface 84 of LNO slab 56 in the embodiment of FIG. 8.

Figure 9:
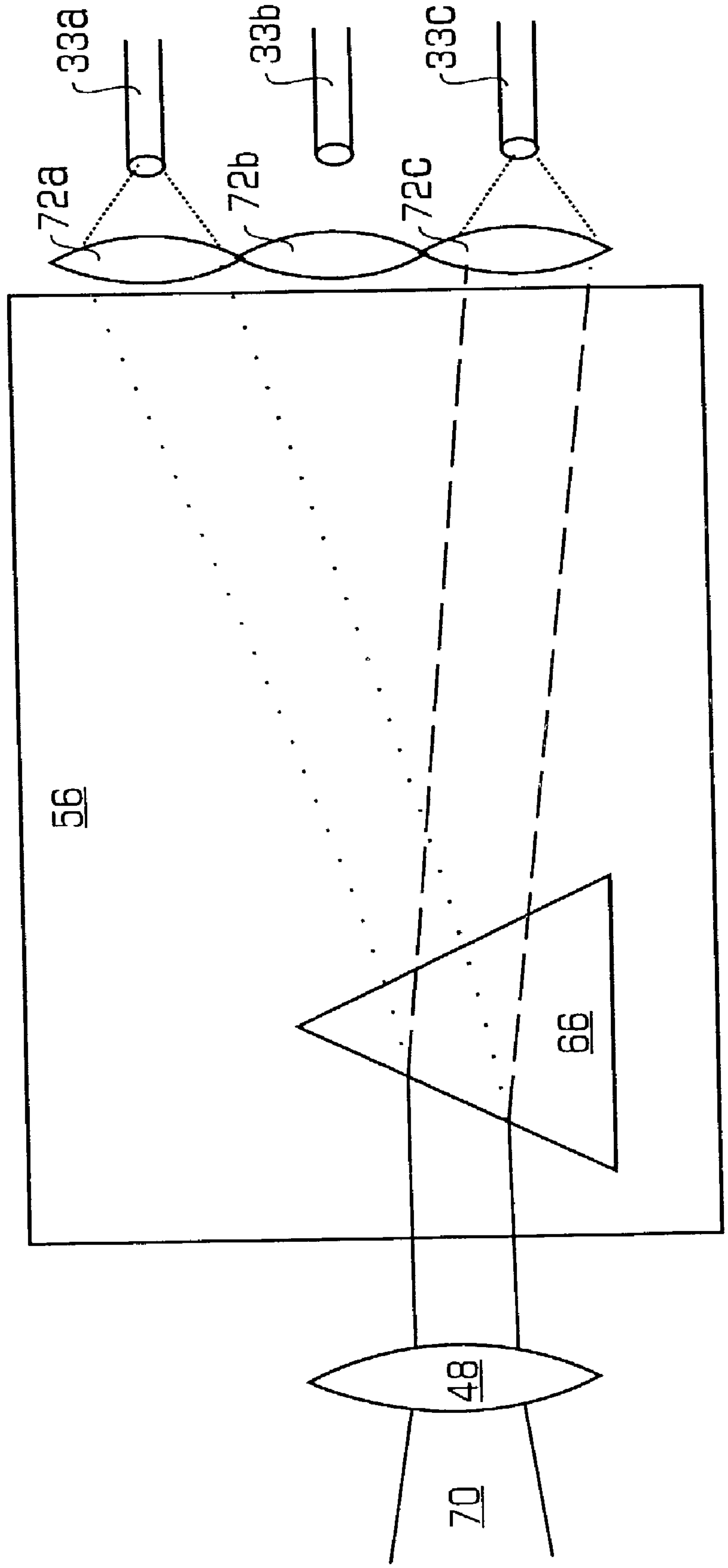
FIG. 9 depicts a top view of a deflected light beam propagating through the LNO slab of FIG. 8.

FIG. 9 depicts a top view of a deflected light beam 70 propagating through the LNO slab 56 of FIG. 8. The top view shows that this particular deflector 50 is configured with three possible angles of deflection. As in FIG. 8, there is a focusing lens 80 that focuses the input beam into the input waveguide 64 of the LNO slab 56. Once the light beam enters LNO slab 56, it passes through prism array 66 and, depending on the voltage that is applied to the LNO slab 56 and the polarization state of the input light beam 70, may become deflected. In one case, the light beam may be deflected by 64 milliradians (as measured from the center of the prism array) to be directed into an optical fiber 33*a*, deflected by 52 milliradians to be directed into optical fiber 33*b*, or be deflected 16 miliradians in the opposite direction (as measured from the center of the last prism the beam exited) to be directed into optical fiber 33*c*. The prism array 66 should be designed for a known polarization state of the input beam 70. The applied voltage can be varied to deflect the input beam 70 a desired amount so that it can be directed into a particular optical fiber and eventually to an intended multiplexer 36 and an intended second fiber optic cable 23.

Figure 10:
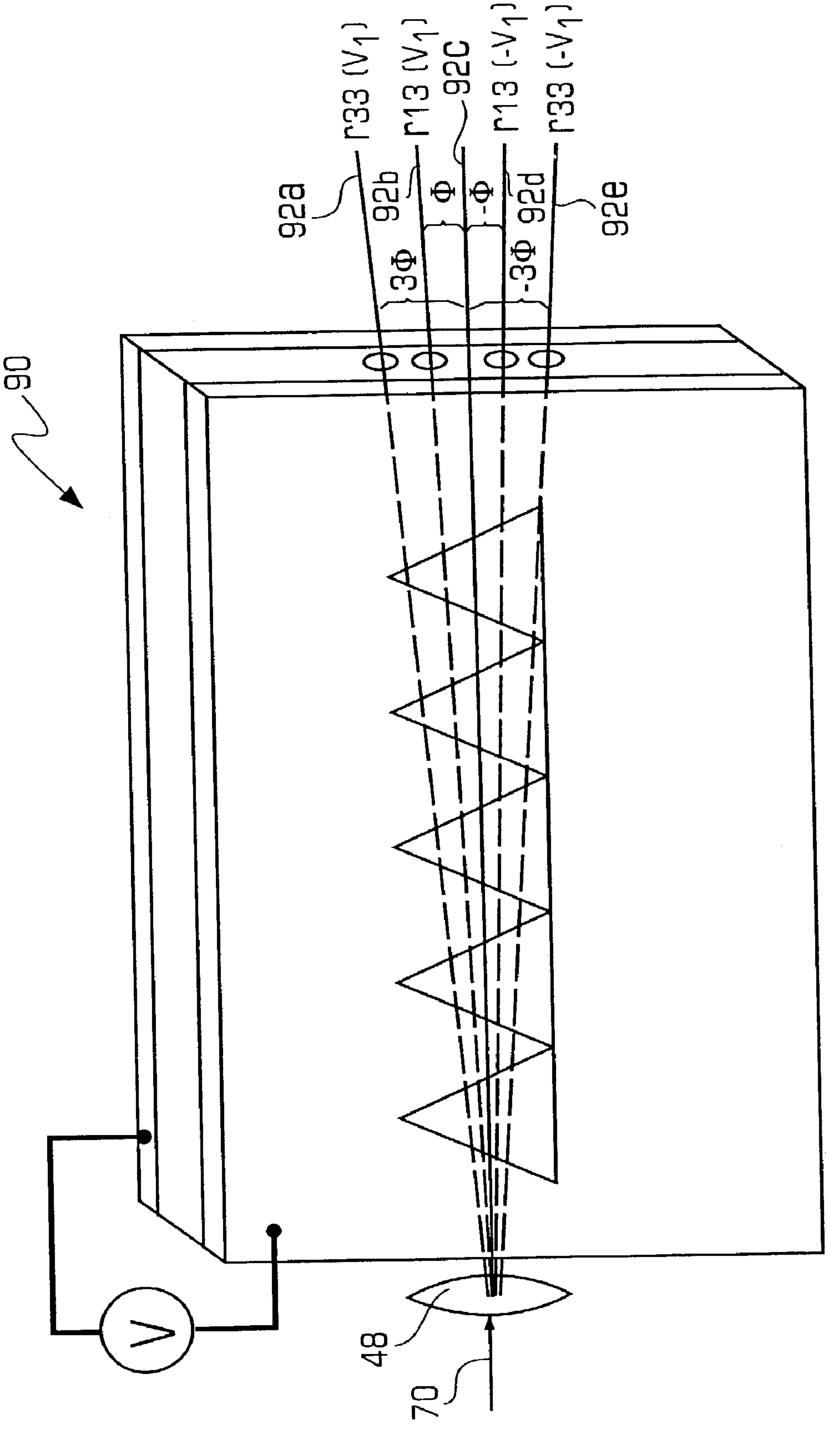
FIG. 10 depicts an exemplary 1×4 deflector that is sensitive to the polarization state of the input beam in accordance with the invention.

FIG. 10 depicts an exemplary 1×4 switch device 90 that is sensitive to the polarization state of the input beam in accordance with the invention. In the embodiment, the length of the switch device 90 is 15 mm, the height of the prism is 0.5–0.7 mm, and the beam width is configured to be about 30–50 μm. As the index of refraction for a light beam passing through the LNO slab 56 depends on the polarization state of the input beam, an input beam 70 may be deflected differently even if the same voltage is applied. More specifically, in this case, a light beam having polarization state TE ($r_{13}$) is deflected upward by an angle Φ when a voltage of $V_1$ is applied to the LNO slab 56 (beam 92*b*). When a voltage of $-V_1$ is applied to the same light beam, the light beam is deflected by the same angle Φ but in the opposite direction, or downward in the figure as beam 92*d*. If the light beam has a polarization state TM ($r_{33}$) instead of TE ($r_{13}$), the light beam is more sensitive to the applied voltage so that a voltage of $V_1$ causes an upward deflection by an angle 3Φ to form beam 92*a*. A voltage of $-V_1$ causes a downward deflection by an angle 3Φ, forming beam 92*e*. When no voltage is applied, no deflection occurs and the light beam may propagate in the path shown by the solid line that extends across LNO slab 56, forming beam 92*c*. This way, an input beam 70 may be switched into one of up to five optical fibers (not shown). Since the polarization state of the input beam is known, the prism array 66 has to be designed for the specific polarization state.

Figure 11:
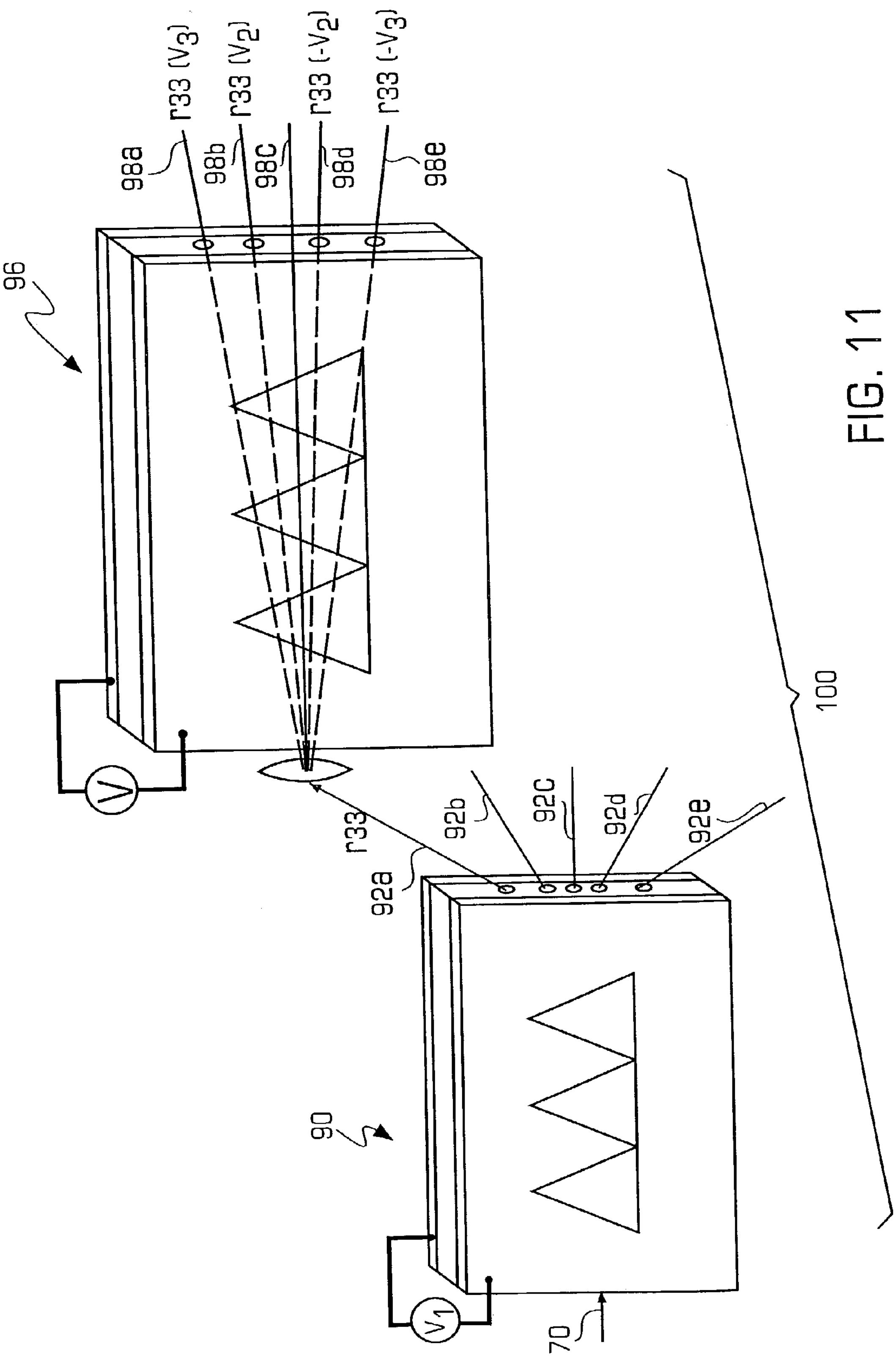
FIG. 11 depicts an exemplary 1×8 deflector implemented with the 1×4 deflector of FIG. 10.

FIG. 11 depicts an exemplary 1×8 deflector 100 implemented with the 1×4 deflector 90 of FIG. 10. This 1×8 switch device 100 is a serial combination of the 1×4 switch device 90 and another 1×4 switch device 96. In more detail, an output beam 92*a* from the 1×4 switch device 90 is used as an input beam for the 1×4 switch device 96. The polarization state of beam 92*a* should be known so that the second 1×4 switch can be configured to operate properly on beam 92*a*. For example, 1×4 switch device 96 may have to be rotated 90° to properly operate on beam 92*a* having a polarization state TM ($r_{33}$) with respect to the plane of the first switch.

The switch device 96 may be made to produce up to five different deflection angles even though there is only one polarization state, by applying two different voltages $V_2$ and $V_3$. When $V_2$ is applied, the beam 92*a* is deflected by a small angle, and propagate in the path of beam 98*b* or beam 98*d* depending on whether the applied voltage is positive or negative. When $V_3$ is applied, the beam 92*a* is deflected by a larger angle to propagate as beam 98*a* or beam 98*e*. When no voltage is applied, the angle of deflection is substantially zero and beam 92*a* may propagate as beam 98*c*. Thus, when switch device 90 and switch device 96 are combined, the beam 70 can be directed in up to nine different directions, as beams 92*b*–92*e* and 98*a*–98*e*.

A monolithic 1×8 switch device may be implemented in accordance with the invention, for example by using two different polarization states and two different applied voltages. However, a monolithic 1×8 switch device may require a higher applied voltage than a 1×8 switch device including multiple LNO slabs.

Figure 12:
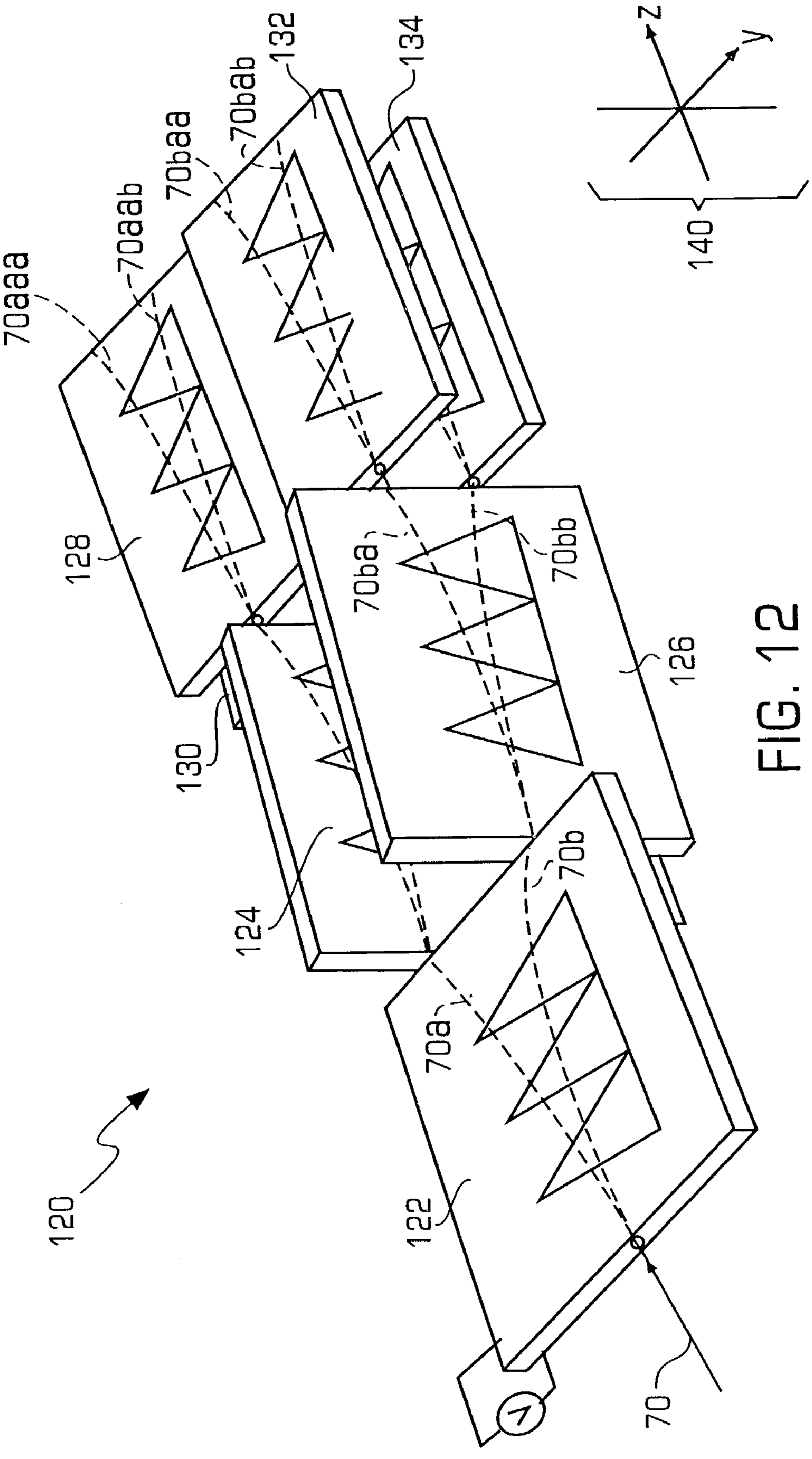
FIG. 12 depicts another exemplary 1×8 switch device 120 in accordance with the invention.

FIG. 12 depicts another exemplary 1×8 deflector 120 in accordance with the invention. The 1×8 switch device 120 includes seven 1×2 switch devices (switch devices 122–134) arranged in three stages, the switches in each stage being positioned at an angle with slabs in the previous stage. The first stage includes one LNO switch 122 and deflects an input beam 70 in one of two directions along the y axis as defined by coordinates 140. The direction in which the light beam propagates is the z-direction, as defined by a coordinate system 140. Depending on the angle of deflection, the input beam 70 becomes either beam 70*a* or beam 70*b*. In the second stage, the beam 70*a* enters LNO switch 124 and the beam 70*b* enters LNO switch 126. The beam 70*a* may be deflected along the x-direction to become a beam 70*aa* or a beam 70*ab* (not shown) as it propagates through LNO switch 124. As for beam 70*b*, it may also be deflected along the x-direction to become a beam 70*ba* or a beam 70*bb* as it propagates through LNO switch 126. In the third stage, each of the four beams further splits into two beams along the y-direction to produce eight output beams. More specifically, beam 70*aa* propagates through LNO switch 128 to become either beam 70*aaa* or beam 70*aab*. The beam 70*ab* propagates thorugh LNO switch 130 to become either beam 70*aba* or beam 70*abb* (not shown). The beam 70*ba* propagates through LNO switch 132 to become either beam 70*baa* or beam 70*bab*. Finally, the beam 70*bb* propagates through LNO switch 134 to become either beam 70*bba* or beam 70*bbb*. Eight optical fibers 33*a*–33*h* may be positioned to receive the light beams coming out of LNO switches 128, 130, 132, and 134.

The LNO switches in 1×8 switching device 120 do not all have to be identical. They may differ in their overall dimensions and the prism array they each contain. A person of ordinary skill in the art would understand that there may be one or more lenses located between each stage to collimate and/or focus the light beams, although not explicitly shown.

Polarization rotation may be necessary between each stage of the multi-slab embodiment in FIG. 7 because different polarization states may have different deflection efficiency. So, when the input beam is linearly polarized, the polarization state must be rotated by 90° when the LNO slab is turned 90° in order to maintain the same deflection efficiency. Each stage may include LNO switches of the types illustrated above in reference to FIGS. 3A–3D. For example, some or all of the LNO switches in the 1×8 switch device 120 may be have an angled exit surface. Furthermore, although the figure depicts the LNO switches of each successive stage as being positioned at a 90°-angle with respect to the LNO switches of the previous stage, the invention is not so limited.

Figure 13:
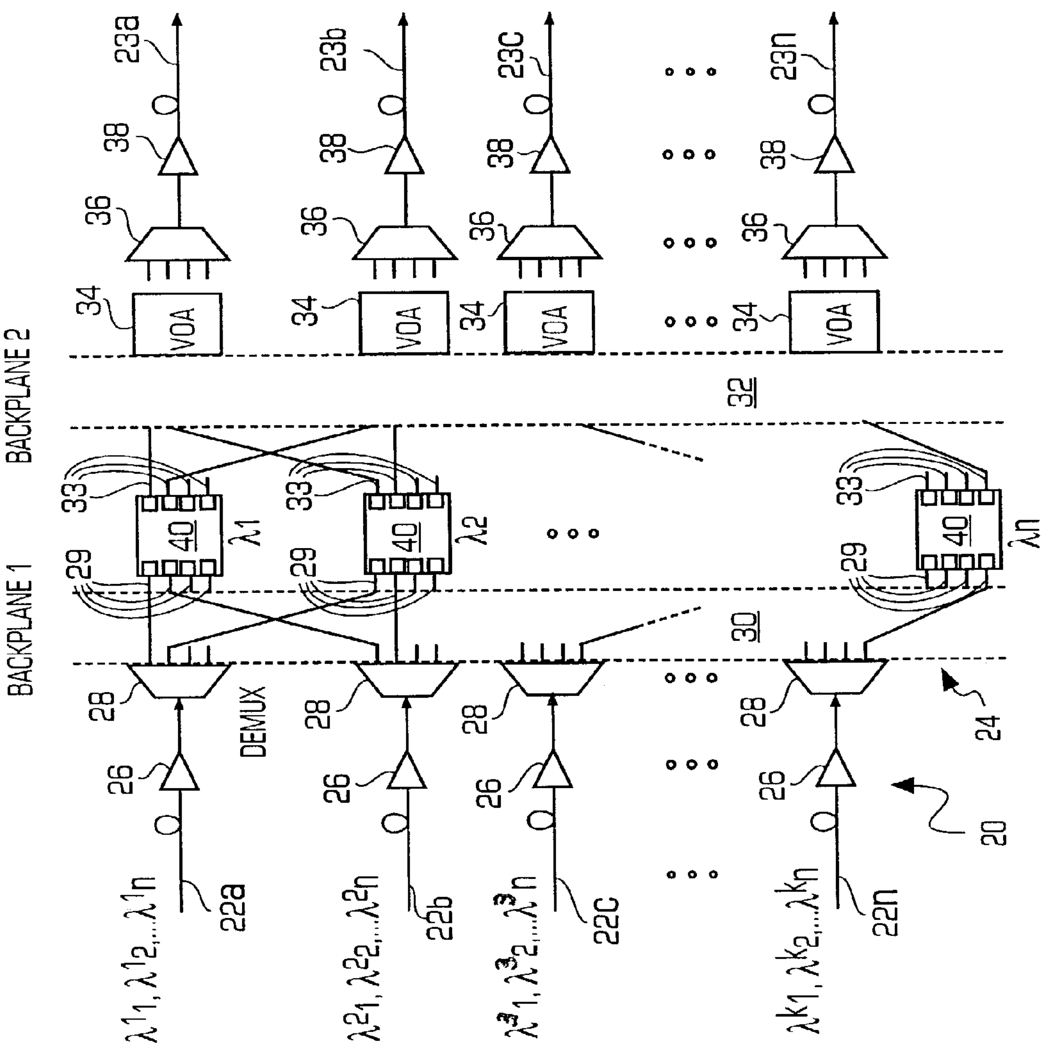
FIG. 13 depicts an exemplary optical switching system 20 in which the deflector of the invention may be implemented.

FIG. 13 depicts an exemplary optical switching system 20 in which the deflector of the invention may be implemented. The optical switching system 20 includes first fiber optic cables 22*a*–22*n*, second fiber optic cables 23*a*–23*n*, and a switching center 24 located between the first fiber optics cables and the second fiber optic cables. Wavelength division multiplexing (WDM) techniques may be used to allow each fiber optic cable 22 and 23 to carry multiple optical signals at various wavelengths which substantially increases the efficiency of each fiber optic cable 22 and 23. The switching center 24 includes multiple optical switches 40 formed in accordance with teachings of the present invention. Optical switches 40 cooperate with each other to allow switching of a selected optical signal from one of the first fiber optic cables 22*a*–22*n* to a selected one of the second fiber optic cables 23*a*–23*n*.

Various features of the invention will be described with respect to switching of an optical signal as it travels from a first fiber optic cable 22 to a second fiber optic cable 23. An optical switch formed in accordance with the invention may be satisfactorily used to switch optical signals traveling in either direction through a fiber optic cable network or through associated waveguides.

Each of the first fiber optic cables 22*a*–22*n* is preferably coupled with switching center 24 through a respective amplifier 26 and a dense wavelength division (DWD) demultiplexer 28. The output from a DWD demultiplexer is fed into an optical switch 40 through one of first optical fibers 29. As the optical switch 40 is not a wavelength-splitter, a particular wavelength output from the demultiplexer 28 is fed into one optical switch 40, effectively making each optical switch 40 receive one wavelength. The backplane 30 is preferably provided for use in optically coupling each DWD demultiplexer 28 with optical switches 40. Likewise, a second backplane 32 is preferably provided to couple the output from optical switches 40 with variable optical attenuators 34. A light beam exiting optical switch 40 reaches one of the variable optical attenuators 34 via one of second optical fibers 33. The variable optical attenuators 34 are provided to adjust the power level of all signals exiting from backplane 32 to within a desired range. These variable optical attenuators 34 are necessary because the power level of each signal transmitted from a respective first fiber optic cable 22 to a respective fiber optic cable 23 may vary significantly.

The variable optical attenuators 34 are coupled with a plurality of DWD multiplexers 36. The power level for each signal communicated through second backplane 32 is preferably adjusted to avoid communication problems associated with multiple signals at different wavelengths and different power levels. Thus, the signals communicated from each DWD multiplexer 36 are preferably directed through a respective amplifier 38 before being transmitted to the associated one of the second fiber optic cables 23.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. An electrooptical deflector comprising:

a material that changes refractive index in response to voltage;

a poled region on the material, the poled region located such that a light beam passes through the poled region while propagating through the material;

an electrode for applying a voltage to the poled region to control a deflection direction of the light beam propagating through the poled region; and a microlens array integrated with the material to focus a deflected light beam.

2. The electrooptical deflector of claim 1, wherein the material comprises one of lithium niobate and lithium tantalite.

3. The electrooptical deflector of claim 1, wherein the poled region includes at least one triangular-shaped prism that affects the deflection direction.

4. The electrooptical deflector of claim 1, further comprising a first buffer layer located adjacent to a first surface of the material and a second buffer layer located adjacent to a second surface of the material.

5. The electrooptical deflector of claim 4, wherein the first buffer layer and the second buffer layer each comprises a dielectric material having an index of refraction lower than the index of refraction of the material.

6. The electrooptical deflector of claim 1, wherein the material is about 100–300 μm thick.

7. The electrooptical deflector of claim 1, wherein the material is about 3–10 mm long.

8. The electrooptical deflector of claim 1, wherein the poled region comprises a triangular-shaped region that is poled in a first direction and a region outside the triangular-shaped region that is poled in a second direction.

9. The electrooptical deflector of claim 1, wherein the poled region comprises a triangular shaped region having a height of 0.1–1.2 mm.

10. The electrooptical deflector of claim 1, wherein the poled region is configured to deflect a light of predetermined polarization state in a preselected direction when an appropriate voltage is applied.

11. The electrooptical switch of claim 1, further comprising a first lens located to receive the light beam and focus the light beam onto a focal plane that is located in the material.

12. The electrooptical deflector of claim 11, wherein the first lens is located to focus the light beam so that the light beam does not diverge to a diameter larger than a thickness of the material while propagating through the material.

13. The electrooptical deflector of claim 11, wherein the first lens is a gradient index lens having a pitch of about 0.2–0.35.

14. The electrooptical deflector of claim 11, further comprising an output optical fiber coupled to a light-emitting side of the first lens.

15. The electrooptical deflector of claim 1, further comprising a lens having a light-receiving surface and light-emitting surface, the light-receiving surface being optically coupled to the material to receive the light beam after the light beam propagates through the poled region, and the light-emitting surface being optically coupled to an optical fiber.

16. The electrooptical deflector of claim 15, wherein the optical fiber is placed in a V-groove in the material.

17. The electrooptical deflector of claim 15, wherein the optical fiber is a thermally expanded core (TEC) fiber.

18. The electrooptical deflector of claim 15, wherein the optical fiber is a single mode fiber.

19. The electrooptical deflector of claim 15, wherein the material has an entrance surface through which the light beam enters the material and an exit surface through which the light beam leaves the material, wherein the exit surface is angled with respect to the entrance surface so that a deflected light beam passes through the exit surface at a substantially normal angle.

20. The electrooptical deflector of claim 19, wherein the lens is positioned to achieve a predetermined optimal coupling efficiency for the deflected light beam coming out of the material.

21. The electrooptical deflector of claim 15, wherein the lens is an array of microlenses.

22. The electrooptical deflector of claim 15, wherein the lens is a gradient index lens.

23. The electrooptical deflector of claim 15, further comprising an epoxy filling the space between the material, the lens, and the optical fiber.

24. The electrooptical deflector of claim 1, wherein the electrooptical deflector is a first electrooptical deflector, further comprising a second electrooptical deflector positioned to receive the light beam exiting the first electrooptical deflector if the light beam propagates in a first direction, and a third electrooptical deflector positioned to receive the light beam exiting the first electrooptical deflector if the light beam propagates in a second direction different from the first direction.

25. The electrooptical deflector of claim 24, further comprising additional electrooptical deflectors coupled to the second electrooptical deflector and the third electrooptical deflector, the additional electrooptical deflectors positioned to receive a light beam exiting at least one of the second electrooptical deflector and the first electrooptical deflector.

26. A method of deflecting a light beam, the method comprising:

directing a linearly polarized light beam into a material that changes refractive index in response to voltage, such that the light beam passes through a poled region in the material; and applying a voltage to the poled region to control a direction of propagation such that the direction of propagation is toward a microlens array integrated with the material.

27. The method of claim 26, further comprising forming a triangular region in the poled region to provide at least one prism in the material.

28. The method of claim 26, further comprising controlling the direction of the light beam by selecting a shape of prism and a number of prisms in the poled region.

29. The method of claim 26, further comprising forming a plurality of triangular regions in the poled region so that the light beam changes in direction of propagation in response to applied voltage as the light beam passes through each prism.

30. The method of claim 26, wherein the material comprises one of lithium tantalite and lithium niobate.

31. The method of claim 26, further comprising focusing the linearly polarized light beam into the material with a gradient index lens.

32. The method of claim 31, wherein the gradient index lens used to focus the linearly polarized light has a pitch of about 0.2 to 0.35.

33. The method of claim 32, wherein the length of the gradient index lens in the direction of beam propagation is 2.845 mm.

34. The method of claim 26, further comprising selecting a direction of deflection by manipulating the polarization state of the light beam and the electrical bias.

35. The method of claim 26, further comprising angling the exit surface to achieve a predetermined optical coupling efficiency between the deflected light beam and an optical fiber.

36. The method of claim 26, further comprising focusing the deflected light beam into an optical fiber with a lens.

37. The method of claim 36, filling the space between the material, the lens, and the optical fiber with an epoxy for index-matching.

38. The method of claim 26, further comprising directing the light beam exiting the material into another material having a poled region that changes the direction of propagation of the light beam.

* * * * *

UNITED STATES PATENT AND TRADEMARK OFFICE
CERTIFICATE OF CORRECTION

PATENT NO. : 6,975,782 B2
APPLICATION NO. : 10/278209
DATED : December 13, 2005
INVENTOR(S) : Maki et al.

It is certified that error appears in the above-identified patent and that said Letters Patent is hereby corrected as shown below:

Drawings
Sheet 5, Replace Figure 8 with the Figure depicted herein below, wherein reference numeral --84-- has been added.

-- --

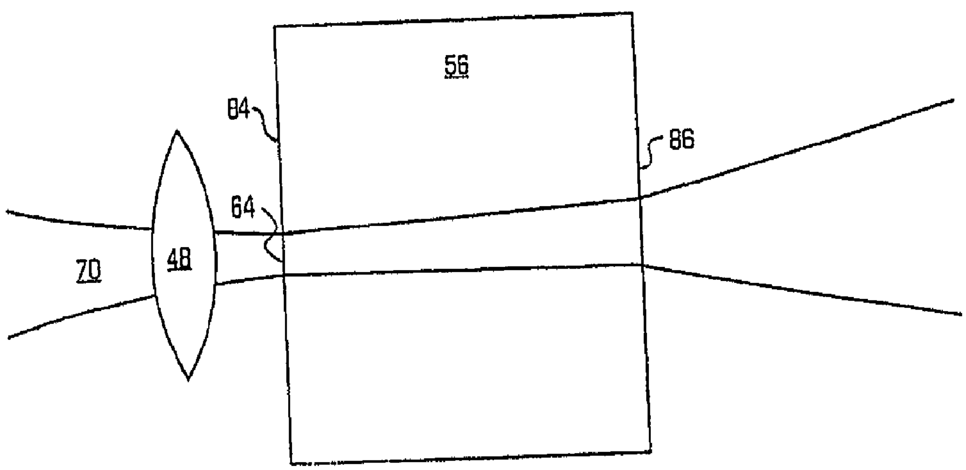

FIG. 8

Column 1
Line 28, change “CD” to --CDs--
Line 29, change “1.3-gigabyte” to --1.3-gigabytes--
Line 39, after “three-dimensionally” remove “,”
Line 39, after “medium” insert --,--
Line 49, change “cause” to --causes--
Line 52, change “electro-optic” to --electrooptic--

Column 2
Line 63, before “not limited” change “is” to --are--
Line 67, change “includes” to --include--

Column 3
Line 33, change “16” to --66--
Line 35, after “for example” insert --,--
Line 46, change “electro-optic” to --electooptic--
Line 65, after “increase” insert --,--

UNITED STATES PATENT AND TRADEMARK OFFICE

CERTIFICATE OF CORRECTION

PATENT NO. : 6,975,782 B2
APPLICATION NO. : 10/278209
DATED : December 13, 2005
INVENTOR(S) : Maki et al.

It is certified that error appears in the above-identified patent and that said Letters Patent is hereby corrected as shown below:

Column 4
Line 22, change “170” to --70--
Line 23, change “170” to --70--
Line 25, change “170” to --70--
Line 47, change “29” to --64--
Line 60, change “waveguide” to --optical fiber--
Line 63, change “waveguide” to --optical fiber--

Column 5
Line 20, change “waveguide” to --optical fiber--
Line 29, change “4A” to --3A--
Line 36, change “54” to --50--

Column 7
Line 26, change “54” to --56--
Line 31, change “82” to --86--
Line 41, change “80” to --48--

Column 8
Line 34, change “propagate” to --propagates--

Column 9
Line 19, change “7” to --12--

Signed and Sealed this

Eighteenth Day of December, 2007

JON W. DUDAS
*Director of the United States Patent and Trademark Office*